US012092273B2

(12) United States Patent
Huang

(10) Patent No.: US 12,092,273 B2
(45) Date of Patent: Sep. 17, 2024

(54) SIMPLE FLUORESCENT FILAMENT MULTI-COLOR LAMP BULB

(71) Applicants: Guangdong Jiaduowang Lighting Tech Co., Ltd, Dongguan (CN); Dongguan Miray E-Tech Co., Ltd, Dongguan (CN)

(72) Inventor: Lizhuan Huang, Dongguan (CN)

(73) Assignees: Guangdong Jiaduowang Lighting Tech Co., Ltd, Dongguan (CN); Dongguan Miray E-Tech Co., Ltd, Dongguan (CN)

( * ) Notice: Subject to any disclaimer, the term of this patent is extended or adjusted under 35 U.S.C. 154(b) by 0 days.

(21) Appl. No.: 18/404,444

(22) Filed: Jan. 4, 2024

(65) Prior Publication Data

US 2024/0142069 A1 May 2, 2024

(30) Foreign Application Priority Data

Apr. 28, 2023 (CN) ......................... 202321020330.8

(51) Int. Cl.

*F21K 9/278* (2016.01)
*F21K 9/232* (2016.01)
*F21K 9/238* (2016.01)
*F21V 9/40* (2018.01)
*F21Y 103/10* (2016.01)
*F21Y 113/17* (2016.01)
*F21Y 115/10* (2016.01)

(52) U.S. Cl.

CPC .............. *F21K 9/278* (2016.08); *F21K 9/232* (2016.08); *F21K 9/238* (2016.08); *F21V 9/40* (2018.02); *F21Y 2103/10* (2016.08); *F21Y 2113/17* (2016.08); *F21Y 2115/10* (2016.08)

(58) Field of Classification Search

CPC . F21K 9/232; F21K 9/238; F21V 9/40; F21V 7/26; F21V 7/30; F21S 4/10

See application file for complete search history.

(56) References Cited

U.S. PATENT DOCUMENTS 11,802,676 B1 * 10/2023 Lei ............................ F21V 3/00
2007/0278953 A1 12/2007 Hagiwara et al.
2011/0095686 A1 * 4/2011 Falicoff .................. F21V 29/75 315/35
2018/0372278 A1 * 12/2018 Zhang ..................... F21K 9/237
2021/0310618 A1 10/2021 Li et al.
2022/0042657 A1 2/2022 Jiang
2023/0204170 A1 * 6/2023 Lee ........................... F21S 4/24 315/167

* cited by examiner

*Primary Examiner* — William N Harris

(74) *Attorney, Agent, or Firm* — Hemisphere Law, PLLC; Zhigang Ma

(57) ABSTRACT

The present disclosure belongs to the technical field of lighting equipment, and in particular to, a simple fluorescent filament multi-color lamp bulb, including a lamp holder, a lampshade, a closing cover, a fluorescence reflection device, end portions of the conductive filaments extends upwards through the closing cover; the fluorescence reflection device is placed in the lampshade; the fluorescence reflection device wraps an LED of the lampwick main body; the lamp holder covers the closing cover and is in threaded connection with the lampshade; and the two conductive filaments are both electrically connected to the lamp holder. Through the above structural setting, a light effect achieved by the LED is colorful.

12 Claims, 16 Drawing Sheets

SIMPLE FLUORESCENT FILAMENT MULTI-COLOR LAMP BULB

TECHNICAL FIELD

The present disclosure belongs to the technical field of lighting equipment, and in particular, to a simple fluorescent filament multi-color lamp bulb.

BACKGROUND

Lighting lamp bulbs refer to lighting sources that emit light and heat through electrical energy. With the development of the society, there are different changes in use of the lamp bulbs. The lamp bulbs were initially designed to provide convenience for production and life, but with the progress of the society, there have been significant changes in the use of the lamp bulbs. Functional lamps for different purposes, such as "lamps used in vehicles, lamps for beautifying the environment, and lamps for decoration", have emerged. Light-emitting diode (LED) colored lamps can provide professional white light, and can also be freely adjusted to adjust colors and brightness of light. Meanwhile, related intelligent functions such as a timer function and a color switching control function can be added through software in the same hardware environment. In the prior art, appropriate LED filaments are selected according to lampshades of different specifications and types. Light-emitting media are added to the lampshade, so that after assembling, color-changeable colored lamps are obtained. During manufacturing of colored lamp structures in the prior art, corresponding components need to be selected and produced according to types of colored lamps. Due to various types and specifications of colored lamps, there are technical problems that lamp bulb components needing to be produced are complex and diversified and the production cost is high.

SUMMARY

The present disclosure aims to provide a simple fluorescent filament multi-color lamp bulb, and aims to solve the technical problem of high production cost of a colored lamp in the prior art.

In order to achieve the above objective, the embodiments of the present disclosure provides a simple fluorescent filament multi-color lamp bulb, including a lamp holder, a lampshade, a closing cover, a fluorescence reflection device, and a lampwick main body, wherein the closing cover is covered at an opening of the lampshade; two threading posts are arranged at a bottom of the closing cover side by side; the two threading posts are provided with threading holes in a penetrating manner; two conductive filaments of the lampwick main body respectively enter the two threading holes; end portions of the conductive filaments extends upwards through the closing cover; the fluorescence reflection device is placed in the lampshade; the fluorescence reflection device wraps an LED of the lampwick main body; the lamp holder covers the closing cover and is in threaded connection with the lampshade; and the two conductive filaments are both electrically connected to the lamp holder.

Preferably, the fluorescence reflection device includes a fixing wire and several reflection strips; each of the reflection strips is arranged in an extension direction of the fixing wire; and end portions of each of the reflection strips resist against an inner side surface of the lampshade to irregularly bend and deform.

Preferably, the fixing wire includes a first fixing wire body and a second fixing wire body; the first fixing wire body and the second fixing wire body are spirally intersected, and each of the reflection strips is clamped between the first fixing wire body and the second fixing wire body.

Preferably, the first fixing wire body and the second fixing wire body are both flexible materials and deform when colliding with an inner wall of the lampshade.

Preferably, the reflection strips are formed by cutting a multifunctional seven-color fluorescent sheet structure.

Preferably, the closing cover further includes a closing baffle plate and a clamping ring configured to be clamped inside the opening of the lampshade; a flat edge of the closing baffle plate does not go beyond a peripheral edge of the opening of the lampshade; the threading posts are vertically mounted at a bottom of the closing baffle plate; an edge of an opening in a bottom of the clamping ring is bent and closed up towards a center; the clamping ring is mounted at the bottom of the closing baffle plate; and the clamping ring is arranged around the threading posts.

Preferably, a top of the closing baffle plate is provided with two placement grooves; each of the two conductive filaments extends through the closing baffle plate into one end of each of the two placement grooves; and the other ends of the two placement grooves respectively extend to a side surface of the closing baffle plate.

Preferably, a first positioning plate is arranged between each of the threading posts and an inner side surface of the clamping ring, and an edge of the first positioning plate is fixedly connected to the bottom of the closing baffle plate, the inner side surface of the clamping ring, and an outer side surface of the threading post, respectively.

Preferably, a second positioning plate is arranged between the two threading posts, and an edge of the second positioning plate is fixedly connected to the bottom of the closing baffle plate and outer side surfaces of the two threading posts, respectively.

Preferably, a distance between the two conductive filaments is the same as a distance between closest edges of the two threading holes, and the two conductive filaments respectively resist against inner side surfaces of the two threading holes.

Preferably, the LED is an LED light bar; the LED light bar has a substrate; a plurality of LED luminous chips are arranged on the substrate; two ends of the substrate are provided with conductive end portions; and the simple fluorescent filament multi-color lamp bulb further comprises a packaging layer arranged on a surface of the substrate and configured to package the LED luminous chips.

Preferably, the lampwick main body includes at least two LED light bars; a support column is arranged between the two LED light bars; the support column is arranged on the closing cover, and a conductive wire is arranged at a top end of the support column; two ends of the conductive wire are electrically connected to the LED light bars respectively; and the other ends of the LED light bars are electrically connected to the conductive filaments.

One or more of the above technical solutions of the simple fluorescent filament multi-color lamp bulb provided by the embodiments of the present disclosure at least has one of the following technical effects:

The simple fluorescent filament multi-color lamp bulb in the present disclosure is composed of the lamp holder, the lampshade, the closing cover, the fluorescence reflection device, and the lampwick main body. It should be noted that the shape of the fluorescence reflection device itself is changeable. On the one hand, it is convenient to place the fluorescence reflection device into the lampshade, and on the other hand, the fluorescence reflection device can better fill an internal space of the lampshade. The lampshade can be made of a transparent or semi-transparent material, and the lampshade can be processed into a desired shape according to a requirement. An opening is formed in a top of the lampshade to assemble relevant components. Through the arrangement of the opening, the fluorescence reflection device is assembled into the lampshade. During the assembling, due to the limitation of an inner side wall of the lampshade, the end portions of the various reflection strips on the fluorescence reflection device are in contact with the inner side wall of the lampshade, and deform and bend. When a length of the fluorescence reflection device is greater than a depth of the internal space of the lampshade, the fixing wire on the fluorescence reflection device collides with the inner wall of the lampshade and bends until the fluorescence reflection device is fully placed into the lampshade. At this time, the closing cover assembled with the lampwick main body is covered at the opening of the lampshade. The two threading posts are arranged at the bottom of the closing cover to mount the lampwick main body. The two conductive filaments of the lampwick main body extend into the threading posts, pass through an upper surface of the closing cover, and extend to the top of the closing cover. An assembling position of the lampwick main body is located through the arrangement of the two threading posts, and the conductive filaments are electrically connected to the lamp holder. The corresponding LED on the lampwick main body are arranged towards a bottom of the internal space of the lampshade. Due to the setting of the length of the conductive filaments on the lampwick main body, a height of the LED is adjusted by adjusting the conductive filaments, so that the LED extends more into the lampshade, and the fluorescence reflection device will bend irregularly due to the limitation of the inner side wall of the lampshade, thereby wrapping the LED that extends into the lampshade.

When the light emitted by the LED irradiates the reflection strips surrounding the fluorescence reflection device, the reflection strips reflect the received light due to their characteristics. Meanwhile, a material used for the reflection strips is a light-transmittance material, so that part of the light continues to irradiate another reflection strip through the reflection strips or is output from the lampshade, achieving that the light emitted by some LEDs is reflected in different directions by the reflection strips in an irregularly bent state. Illumination is achieved, and changes of the light are increased, thereby improving a visual experience of a user. Further, colors of the light emitted by the LED can be adjusted and controlled through settings, so that different colors are switched or various colors are alternately displayed, with regular or irregular changes to enrich the lighting mode. Moreover, the reflection strips can use multicolor paper, the color of which changes at different viewing angles, to improve the overall visual experience of the product. For lampshades in different shapes, it is only necessary to unify the shapes of the openings of the lampshades to adapt to the lamp holder and the closing cover. A lowering depth of the LED can be adjusted correspondingly according to a depth of the lampshade, so that during production and assembling of lamp bulbs of different specifications and styles, lamp bulbs in different shapes can be processed by only adjusting the styles of the lampshades according to corresponding lamp holders and closing covers. Through the above structural settings, the structure of the lamp bulb is simplified, the adaptability of a lamp bulb accessory of a colored lamp is improved, the production cost is greatly reduced, and the overall visual effect of the light of the product is improved.

BRIEF DESCRIPTION OF THE DRAWINGS

To describe the technical solutions in the embodiments of the present disclosure more clearly, the following briefly introduces the accompanying drawings for describing the embodiments or the related art. Apparently, the accompanying drawings in the following description show merely some embodiments of the present disclosure, and a person of ordinary skill in the art may still derive other drawings from the accompanying drawings without creative efforts.

REFERENCE NUMERALS IN THE DRAWINGS

Figure 1:
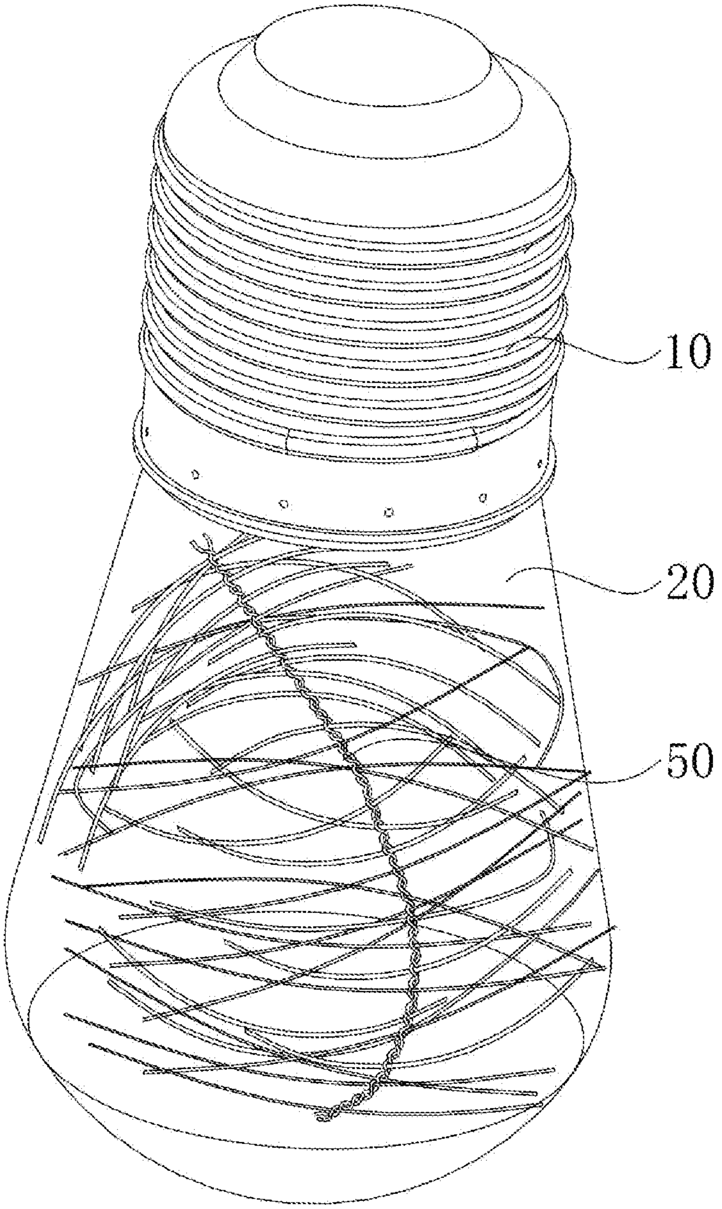
FIG. 1 is an effect picture of a simple fluorescent filament multi-color lamp bulb (style I) according to an embodiment of the present disclosure.
Figure 2:
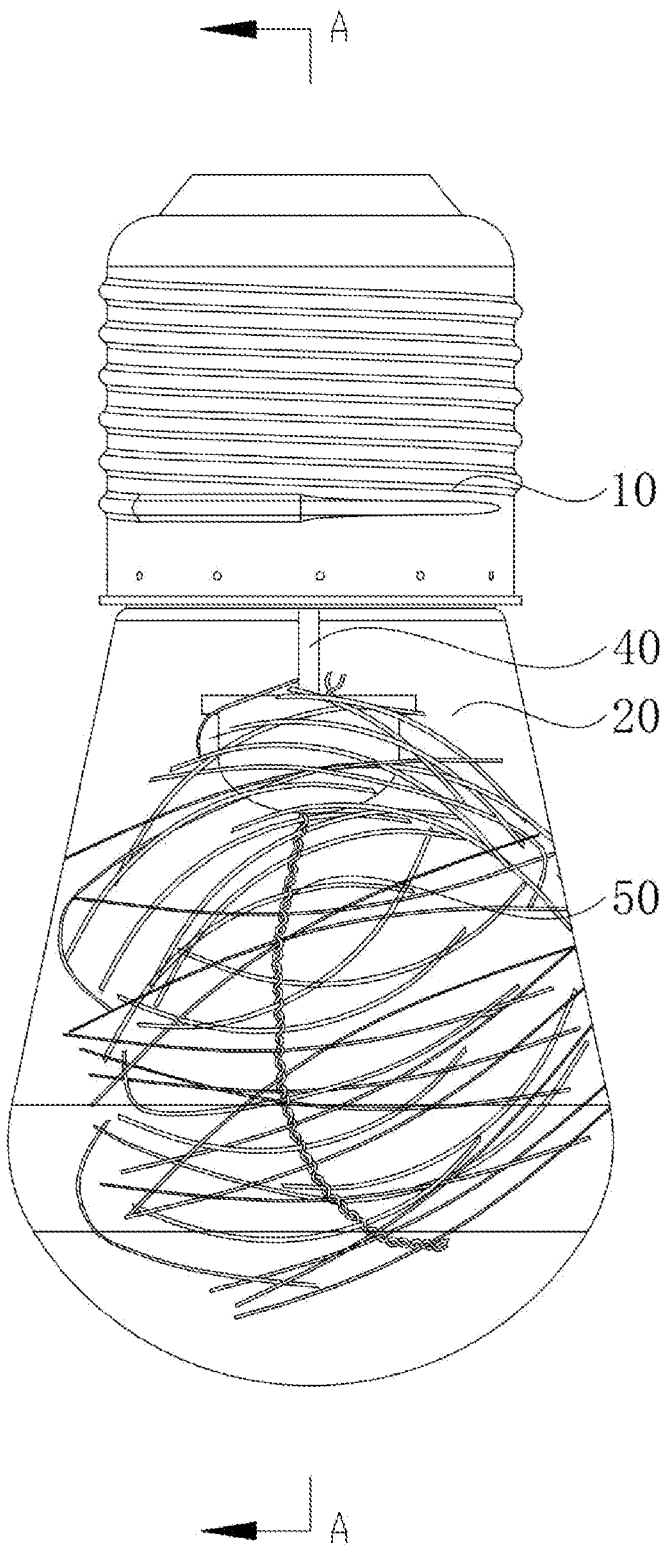
FIG. 2 is a side view of a simple fluorescent filament multi-color lamp bulb (style II) according to an embodiment of the present disclosure.

10: lamp holder; 20: lampshade; 30: closing cover; 31: threading post; 32: closing baffle plate; 33: clamping ring;

40: lampwick main body; 41: LED; 42: conductive filament;

50: fluorescence reflection device; 51: fixing wire; 52: reflection strip;

311: first positioning plate; 312: second positioning plate; 321: placement groove;

511: first fixing wire body; 512: second fixing wire body; 6: substrate;

61: LED luminous chip; 62: conductive end portion; 63: packaging layer;

64: support column; and 641: conductive wire.

DETAILED DESCRIPTION OF THE EMBODIMENTS

The embodiments of the present disclosure are described in detail below, and examples of the embodiments are shown in FIG. 1 to FIG. 16, where the same or similar elements or the elements having same or similar functions are denoted by the same or similar reference numerals throughout the description. The embodiments described below with reference to the accompanying drawings are exemplary and used only for explaining the embodiments of the present disclosure, and should not be construed as a limitation on the present disclosure.

In the descriptions of the embodiments of the present disclosure, it should be understood that orientations or positional relationships indicated by the terms "length", "width", "upper", "lower", "front", "rear", "left", "right", "vertical", "horizontal", "top", "bottom", "inner", "outer", and the like are orientations or positional relationships as shown in the drawings, and are only for the purpose of facilitating and simplifying the descriptions of the embodiments of the present disclosure instead of indicating or implying that devices or elements indicated must have particular orientations, and be constructed and operated in the particular orientations, so that these terms are not construed as limiting the present disclosure.

In addition, the terms "first" and "second" are used for descriptive purposes only and are not to be construed as indicating or implying relative importance or to implicitly indicate the number of technical features indicated. From this, features defined as "first" and second" may explicitly or implicitly include one or more features. In the description of the embodiments of the present disclosure, "plurality" means two or more, unless otherwise expressly and specifically defined.

In the embodiments of the present disclosure, unless otherwise expressly specified and limited, the terms "mount", "connect", "connection", "fix", and the like should be understood in a broad sense, such as, a fixed connection, a detachable connection, an integrated connection, a mechanical connection, an electrical connection, a direct connection, an indirect connection through an intermediate medium, an internal communication of two elements, or interaction between two elements. Those of ordinary skill in the art can understand the specific meanings of the above terms in the embodiments of the present disclosure according to specific situations.

In one embodiment of the present disclosure, as shown in FIG. 1 to FIG. 12, a simple fluorescent filament multi-color lamp bulb is provided, including a lamp holder 10, a lampshade 20, a closing cover 30, a fluorescence reflection device 50, and a lampwick main body 40. The lamp holder 10 is configured to connect the lamp bulb with a connector to complete assembling of the lamp bulb. The lampshade 20 fixes an overall shape of the lamp bulb. The closing cover 30 is configured to package the lampshade 20. The fluorescence reflection device 50 is configured to reflect light emitted by the lampwick main body 40. The closing cover 30 is covered at an opening of the lampshade 20. The closing cover 30 is covered at the opening of the lampshade 20 to complete the packaging of the lampwick main body 40. Two threading posts 31 are arranged side by side at a bottom of the closing cover 30, and the two threading posts 31 are provided with threading holes in a penetrating manner. Two conductive filaments 42 of the lampwick main body 40 respectively enter the two threading holes. The conductive filaments 42 are led out to be connected to other components through the threading holes formed in the two threading posts 31. End portions of the conductive filaments 42 extend upwards through the closing cover 30. The conductive filaments 42 passes through the closing cover 30 along the threading holes and are connected to other external components. The fluorescence reflection device 50 is placed inside the lampshade 20, and the fluorescence reflection device 50 wraps an LED 41 of the lampwick main body 40. The fluorescence reflection device 50 wraps the LED 41 that extends into the lampshade 20. When the power is on, the LED 41 emits light. As the LED is wrapped by the fluorescence reflection device 50, and reflection strips 52 in the fluorescence reflection device 50 are made of a light-transmittance material, the light emitted by the LED 41 irradiates the reflection strips 52 and is then reflected. Part of the light passes through reflection surfaces and continues to irradiate next reflection strips 52. The same part of the light is reflected. The light is reflected for multiple times. Since the various reflection strips 52 on the fluorescence reflection device 50 that wraps the LED 41 reflect part of the light in various angles, and part of the light directly passes through the fluorescence reflection device 50 to irradiate the outside, this achieves a lighting function of a colored lamp, satisfies multi-directional reflection of the light, and improves the user experience. The lamp holder 10 covers the closing cover 30 and is in threaded connection with the lampshade 20. When the lamp holder 10 and the lampshade 20 are in threaded connection with each other, other fixing methods are added to overlapping parts of the lamp holder 10 and the lampshade 20, so as to prevent the threaded connection from being loosened. The two conductive filaments 42 are electrically connected to the lamp holder 10, which achieves circuit connection of the LED 41.

The simple fluorescent filament multi-color lamp bulb in the present disclosure is composed of the lamp holder 10, the lampshade 20, the closing cover 30, the fluorescence reflection device 50, and the lampwick main body 40. It should be noted that the shape of the fluorescence reflection device 50 itself is changeable. On the one hand, it is convenient to place the fluorescence reflection device 50 into the lampshade 20, and on the other hand, the fluorescence reflection device 50 can better fill an internal space of the lampshade 20. The lampshade 20 can be made of a transparent or semi-transparent material, and the lampshade 20 can be processed into a desired shape according to a requirement. An opening is formed in a top of the lampshade 20 to assemble relevant components. Through the arrangement of the opening, the fluorescence reflection device 50 is assembled into the lampshade 20. During the assembling, due to the limitation of an inner side wall of the lampshade 20, the end portions of the various reflection strips 52 on the fluorescence reflection device 50 are in contact with the inner side wall of the lampshade 20, and deform and bend. When a length of the fluorescence reflection device 50 is greater than a depth of the internal space of the lampshade 20, a fixing wire 51 on the fluorescence reflection device 50 collides with the inner wall of the lampshade 20 and bends until the fluorescence reflection device 50 is fully placed into the lampshade 20. At this time, the closing cover 30 assembled with the lampwick main body 40 is covered at the opening of the lampshade 20. The two threading posts 31 are arranged at the bottom of the closing cover 30 to mount the lampwick main body 40. The two conductive filaments 42 of the lampwick main body 40 extend into the threading posts 31, pass through an upper surface of the closing cover 30, and extend to the top of the closing cover 30. An assembling position of the lampwick main body 40 is located through the arrangement of the two threading posts 31. The conductive filaments 42 are electrically connected to the lamp holder 10. The corresponding LED 41 on the lampwick main body 40 are arranged towards a bottom of the internal space of the lampshade 20. Due to the setting of the length of the conductive filaments 42 on the lampwick main body 40, a height of the LED 41 is adjusted by adjusting the conductive filaments 42, so that the LED 41 extends more into the lampshade 20, and the fluorescence reflection device 50 will bend irregularly due to the limitation of the inner side wall of the lampshade 20, thereby wrapping the LED 41 that extends into the lampshade 20. In the fluorescence reflection device 50, it is also possible that the plurality of reflection strips 52 are coiled up and placed into the lampshade 20. Some of the reflection strips 52 at the top end also wrap the LED 41.

When the light emitted by the LED 41 irradiates the reflection strips 52 surrounding the fluorescence reflection device 50, the reflection strips 52 reflect the received light due to their characteristics. Meanwhile, a material used for the reflection strips 52 is a light-transmittance material, so that part of the light continues to irradiate another reflection strip 52 through the reflection strips 52 or is output from the lampshade 20, achieving that the light emitted by some LEDs 41 is reflected in different directions by the reflection strips 52 in an irregularly bent state when the lamp is turned on. Illumination is achieved, and changes of the light are added, thereby improving a visual experience of a user. Further, colors of the light emitted by the LED 41 can be adjusted and controlled through settings, so that different colors are switched or various colors are alternately displayed, with regular or irregular changes to enrich the lighting mode. Moreover, the reflection strips 52 can use multi-color fluorescent sheet, the color of which changes at different viewing angles, to improve the overall visual experience of the product. For lampshades 20 in different shapes, it is only necessary to unify the shapes of the openings of the lampshades 20 to adapt to the lamp holder 10 and the closing cover 30. A lowering depth of the LED 41 can be adjusted correspondingly according to a depth of the lampshade 20, so that during production and assembling of lamp bulbs of different specifications and styles, lamp bulbs in different shapes can be processed by only adjusting the styles of the lampshades 20 according to corresponding lamp holders 10 and closing covers 30. Through the above structural settings, the light emitted by the LED is colorful.

In another embodiment of the present disclosure, as shown in FIG. 1 to FIG. 3, FIG. 8, and FIG. 10 to FIG. 12, the fluorescence reflection device 50 includes a fixing wire 51 and several reflection strips 52. The fixing wire 51 fixes the overall shape of the fluorescence reflection device 50. The entire fluorescence reflection device 50 is adjusted by changing a curvature of the fixing wire 51, to adapt to the internal spaces of the lampshades 20 in different shapes. A length of each reflection strip 52 is greater than a width of a widest part of an inner cavity of the lampshade 20. The reflection strips 52 can bend under the limitation of the inner cavity of the lampshade 20 only when the fluorescence reflection device 50 is placed inside the lampshade 20, to fill the space of the inner cavity of the lampshade 20. The various reflection strips 52 are arranged in an extension direction of the fixing wire 51. End portions of each of the reflection strips 52 resist against an inner side surface of the lampshade 20 to irregularly bend and deform to wrap the LED 41 that extends into the inner cavity of the lampshade 20, achieving the best visual effect of the light.

Figure 8:
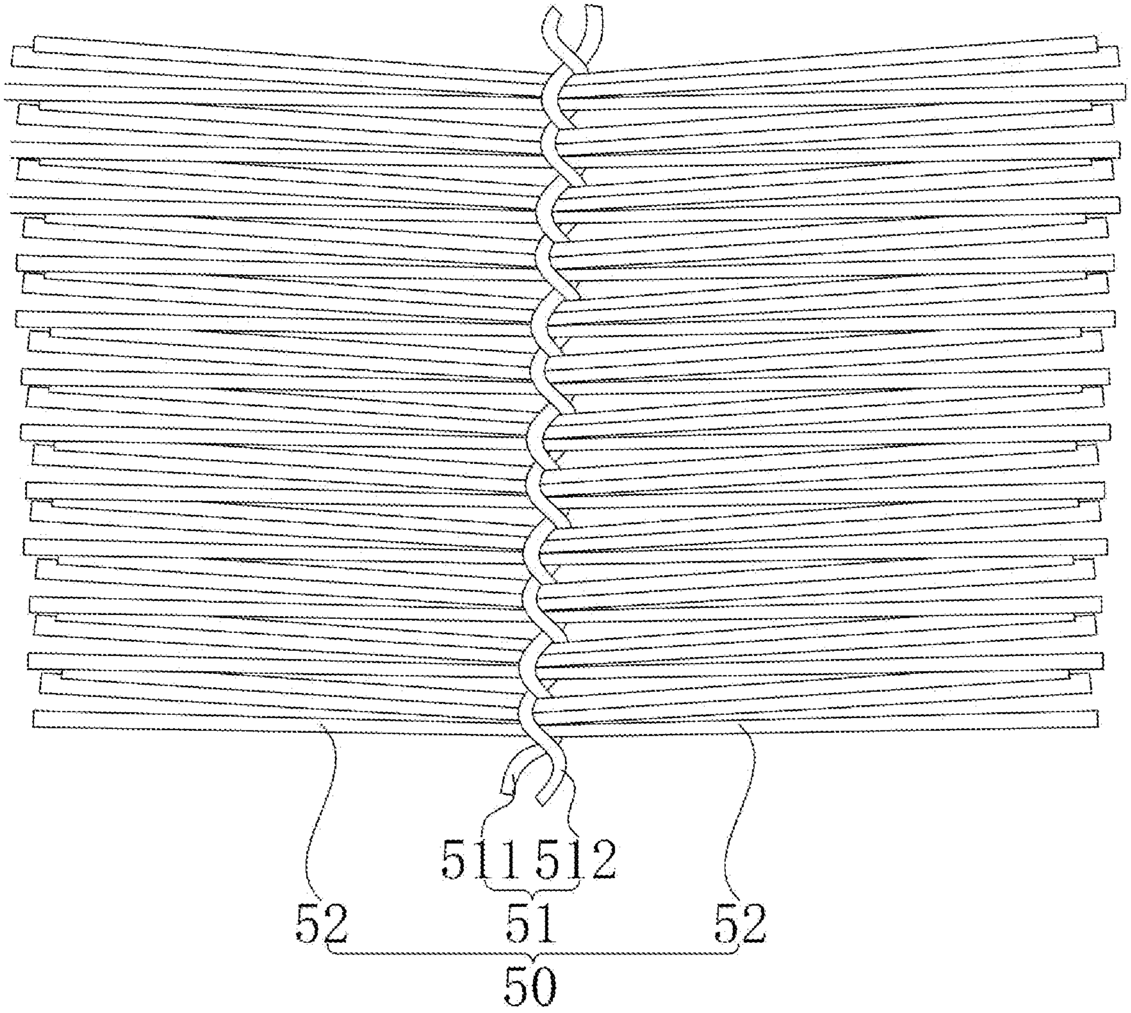
FIG. 8 is a side view of a fluorescence reflection device of a simple fluorescent filament multi-color lamp bulb according to an embodiment of the present disclosure.
Figure 9:
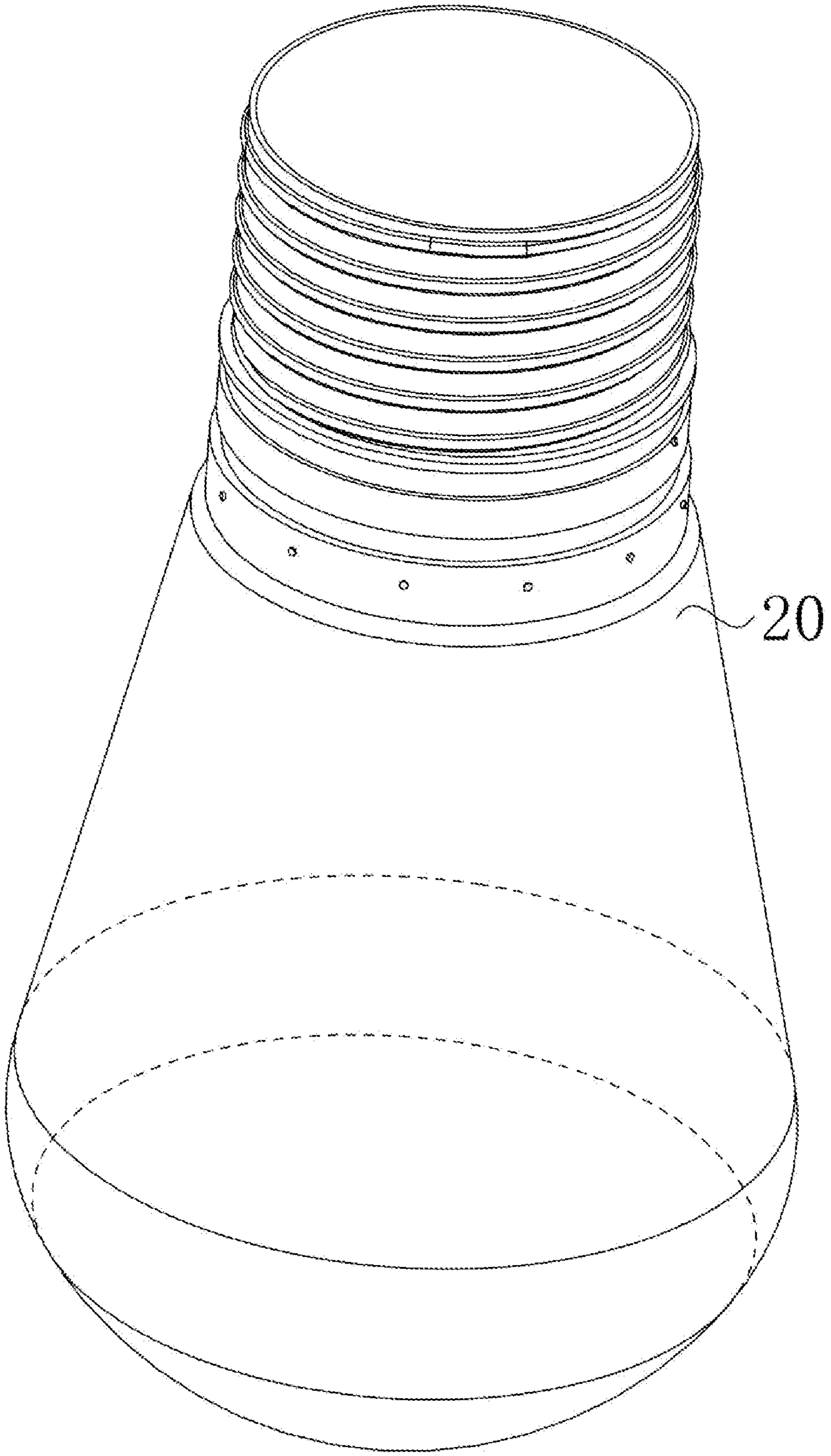
FIG. 9 is an effect picture of a lampshade of a simple fluorescent filament multi-color lamp bulb (style I) according to an embodiment of the present disclosure.
Figure 10:
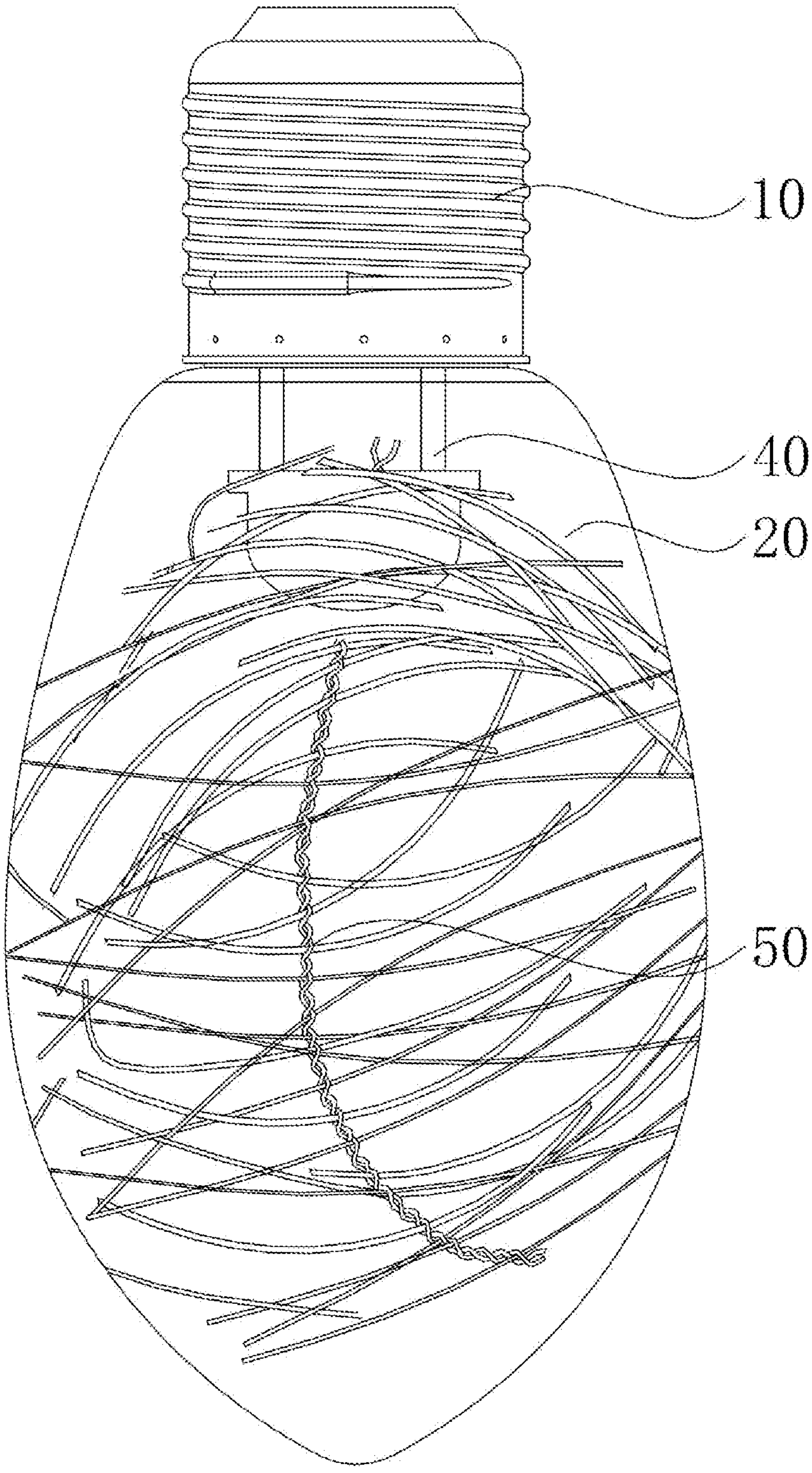
FIG. 10 is a side view of wrapping an LED by a fluorescence reflection device of a simple fluorescent filament multi-color lamp bulb (style II) according to an embodiment of the present disclosure.
Figure 11:
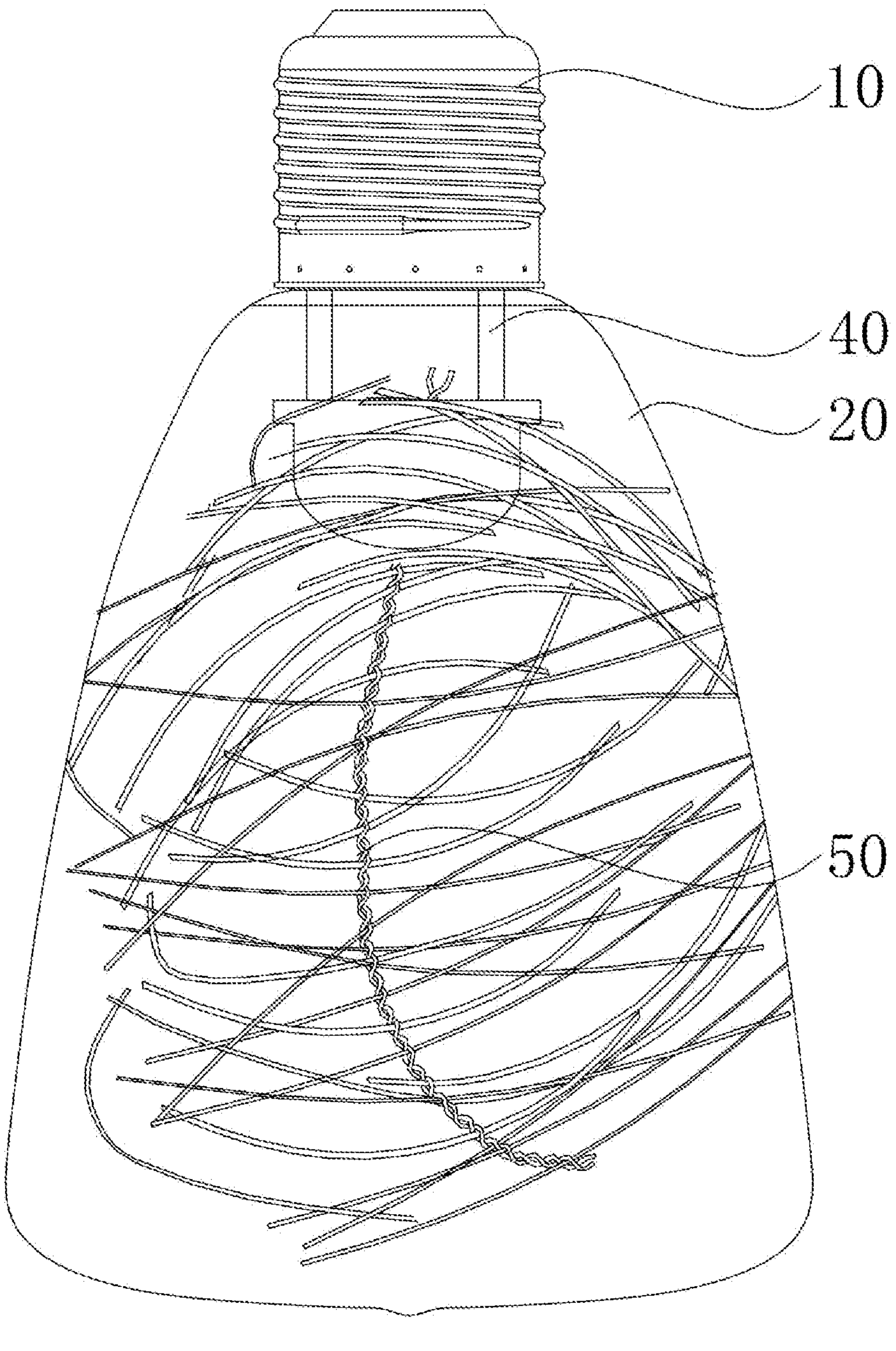
FIG. 11 is a side view of wrapping an LED by a fluorescence reflection device of a simple fluorescent filament multi-color lamp bulb (style III) according to an embodiment of the present disclosure.
Figure 12:
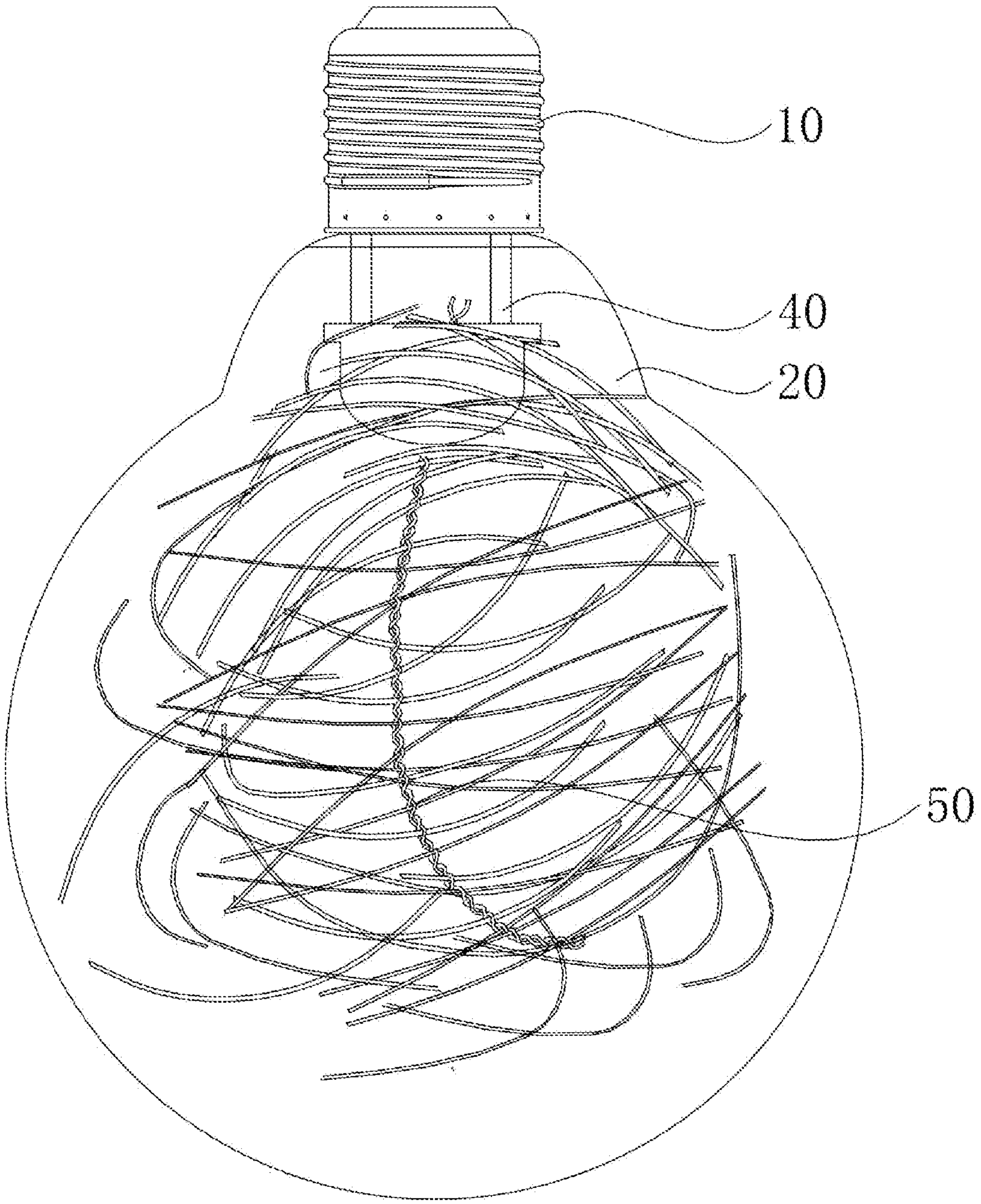
FIG. 12 is a side view of wrapping an LED by a fluorescence reflection device of a simple fluorescent filament multi-color lamp bulb (style IV) according to an embodiment of the present disclosure.

In another embodiment of the present disclosure, as shown in FIG. 8, the fixing wire 51 includes a first fixing wire body 511 and a second fixing wire body 512. The first fixing wire body 511 and the second fixing wire body 512 are spirally intersected, and each reflection strip 52 is clamped between the first fixing wire body 511 and the second fixing wire body 512. The first fixing wire body 511 and the second fixing wire body 512 are combined in a spiral intersecting manner to wave the various reflection strips 52 to form the fluorescence reflection device 50. A plurality of combination gaps will appear in an orderly manner on a combination of the first fixing wire body 511 and the second fixing wire body 512, and the various reflection strips 52 are assembled in the combination gaps to achieve orderly assembling of the reflection strips 52 on the first fixing wire body 511 and the second fixing wire body 512, thereby obtaining the fluorescence reflection device 50 in a relatively fixed shape. By use of the deformation of the reflection strips 52, the fluorescence reflection device 50 is placed inside the lampshade 20 through the opening on the lampshade 20. The irregular bending change of the plurality of reflection strips 52 can fill the space inside the lampshade 20, which effectively ensures the visual effect of the colored lamp after the LED 41 is powered on. On the other hand, the deformations of the first fixing wire body 511 and the second fixing wire body 512 can ensure that the fluorescence reflection device 50 of the same specification can be assembled into different types of lampshades 20.

In another embodiment of the present disclosure, as shown in FIG. 8, the first fixing wire body 511 and the second fixing wire body 512 are both flexible materials and deform when colliding with an inner wall of the lampshade 20. The selection of the materials of the first fixing wire body 511 and the second fixing wire body 512 can effectively reduce production of many types of the fluorescence reflection devices 50 before assembling of the product, reduce production of many types in an early production preparation process, and effectively reduce the production cost.

In another embodiment of the present disclosure, as shown in FIG. 1 to FIG. 3, FIG. 8, and FIG. 10 to FIG. 12, the reflection strips 52 are formed by cutting a multifunctional seven-color fluorescent sheet structure. The multifunctional seven-color fluorescent sheet structure ensures a light reflection effect of the reflection strips 52 and a lighting effect of the light. When observed in another angle, the multifunctional seven-color fluorescent sheet structure has changeable colors itself. The multifunctional seven-color fluorescent sheet structure can be a piece of transparent multi-color paper.

Figure 3:
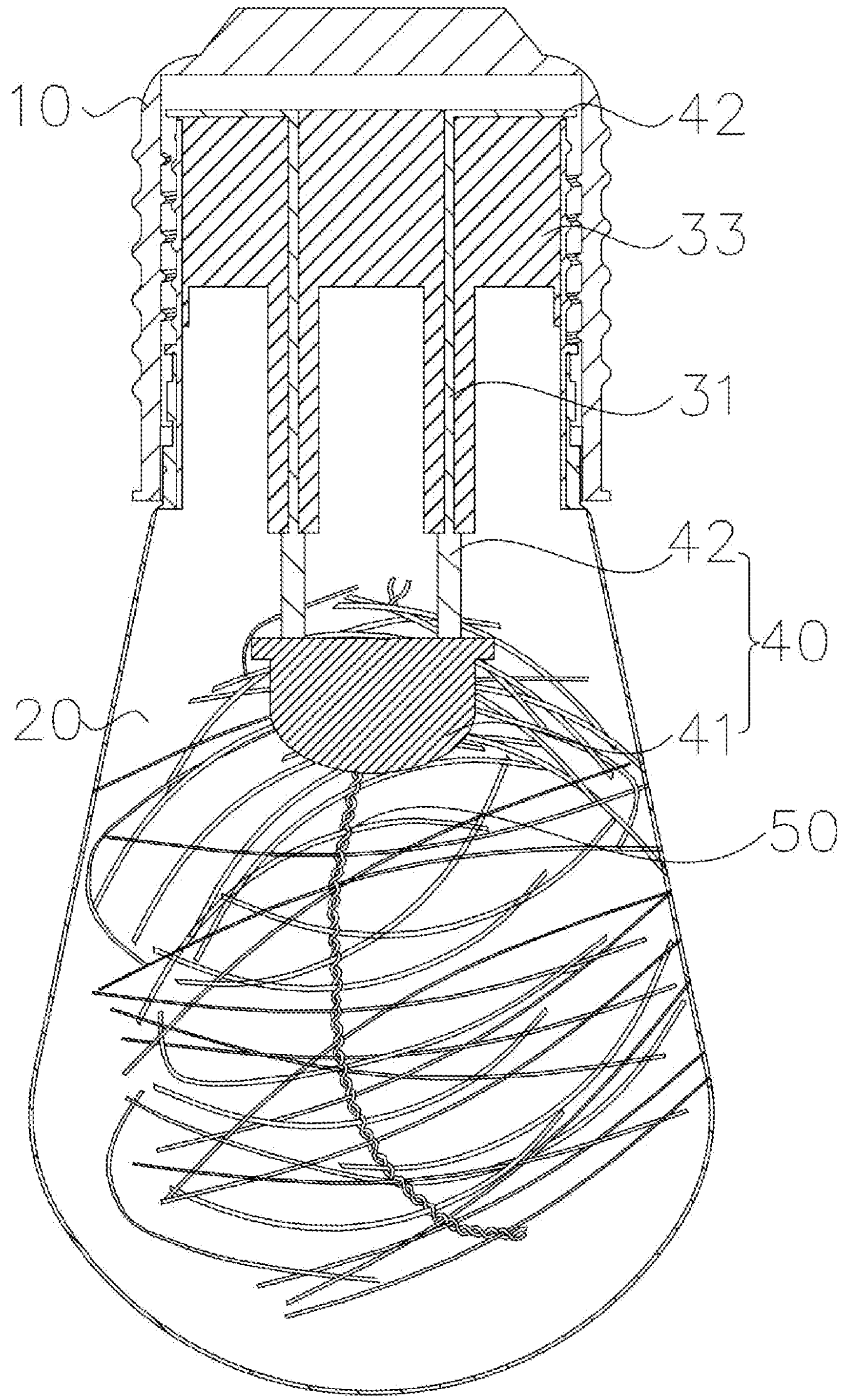
FIG. 3 is a sectional view of line A-A in FIG. 2.
Figure 4:
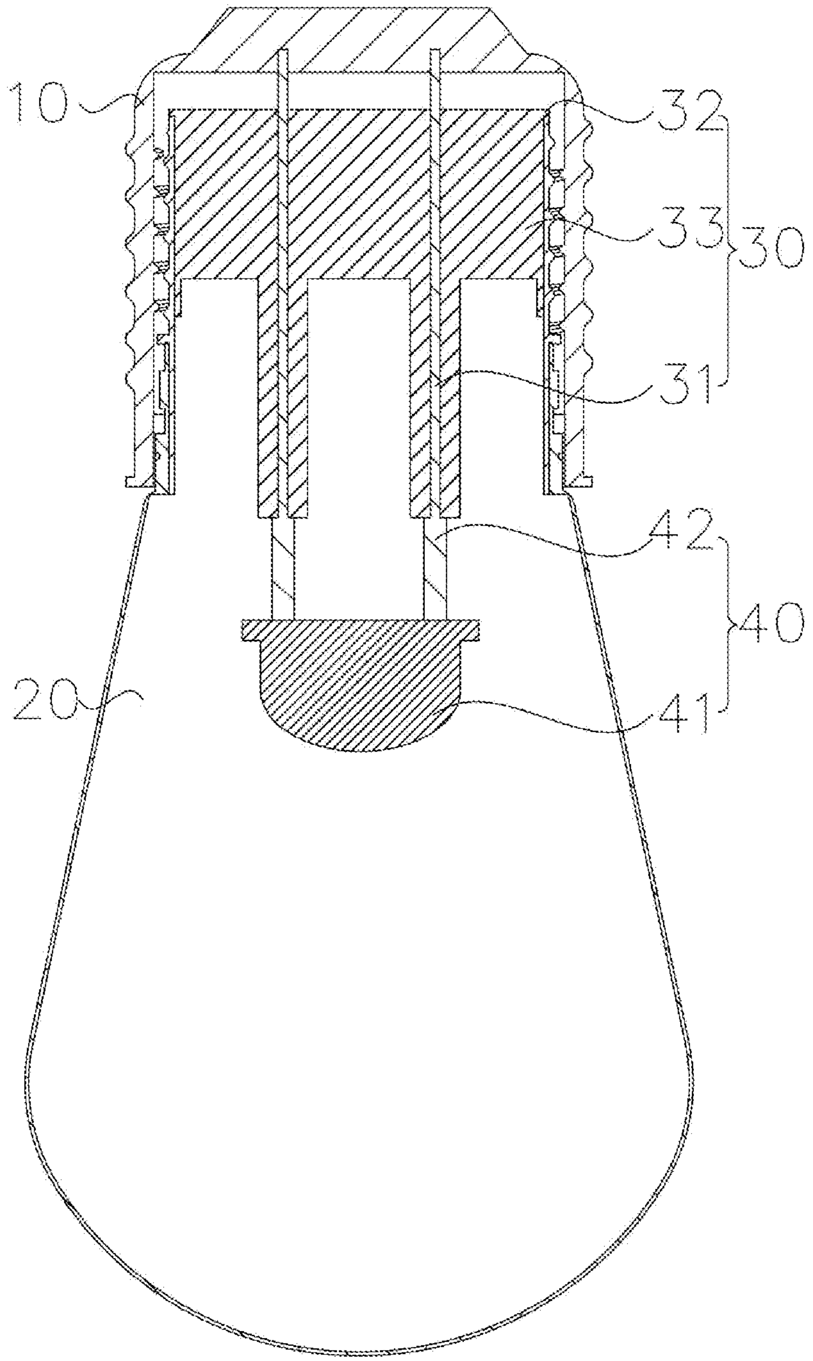
FIG. 4 is a sectional view of line A-A (without a fluorescence reflection device) in FIG. 2.
Figure 5:
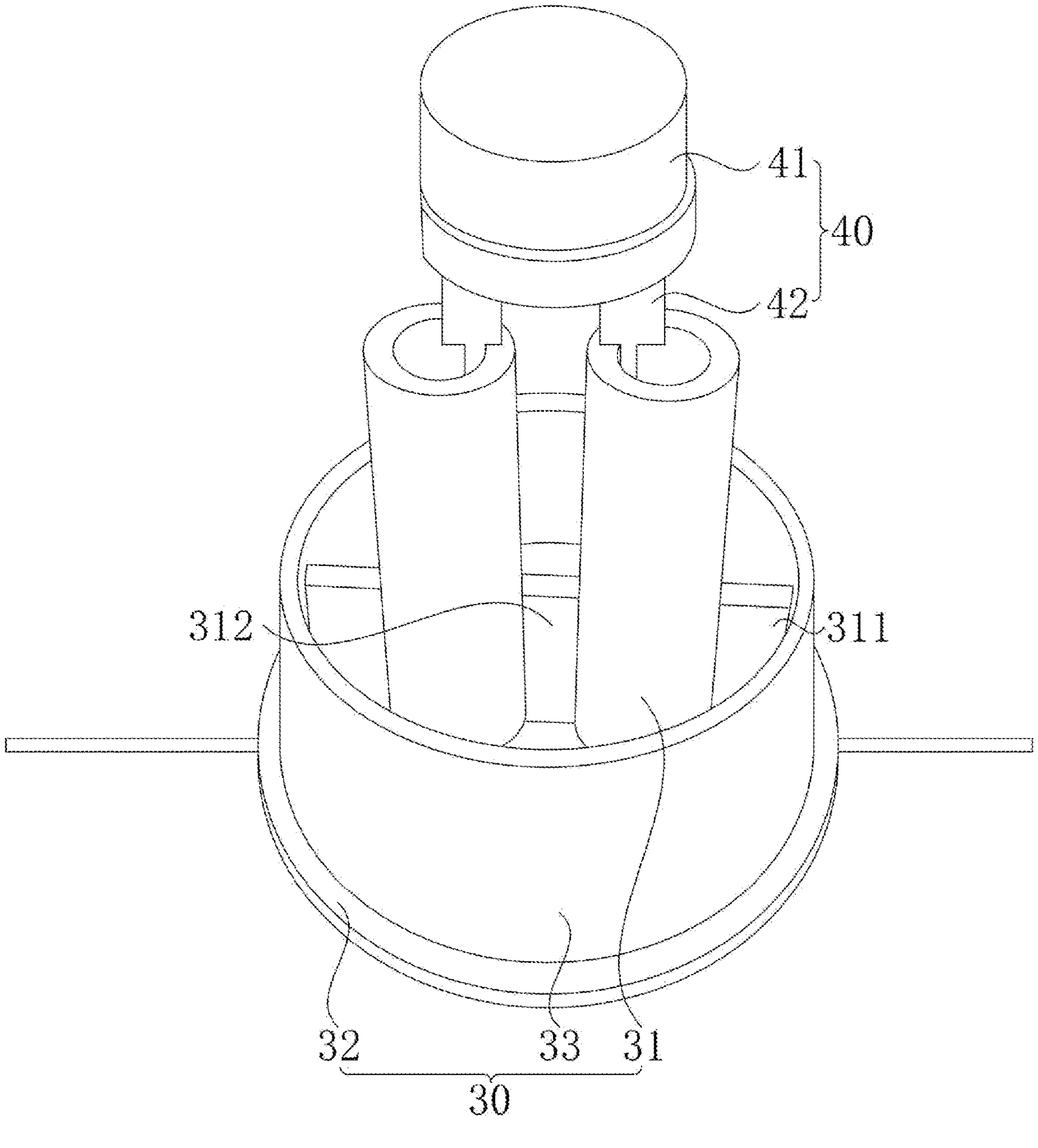
FIG. 5 is an effect picture of assembling a lampwick main body on a closing cover (style I) of a simple fluorescent filament multi-color lamp bulb according to an embodiment of the present disclosure.

In another embodiment of the present disclosure, as shown in FIG. 3 to FIG. 5, the closing cover 30 further includes a closing baffle plate 32 and a clamping ring 33 configured to be clamped inside the opening of the lampshade 20. During assembling of the closing cover 30, an edge of the closing baffle plate 32 resists against an edge top of the opening of the lampshade 20 to limit the position of the closing cover 30 and avoid the closing cover 30 from being assembled into the lampshade 20. The clamping ring 33 is in contact with an inner side wall of a protruding part of the opening of the lampshade 20, so that the closing cover 30 is prevented from easily moving through a friction force therebetween. A flat edge of the closing baffle plate 32 does not go beyond a peripheral edge of the opening of the lampshade 20, to avoid an obstruction on the lamp holder 10 during the assembling of the lamp holder 10 because the edge of the closing baffle plate 32 protrudes out of the peripheral edge of the opening of the lampshade 20. The threading posts 31 are vertically mounted at a bottom of the closing baffle plate 32; and an edge of an opening in a bottom of the clamping ring 33 is bent and closed up towards a center. The opening in the bottom of the clamping ring 33 is closed up, so that a diameter of the opening in the bottom of the clamping ring 33 can be less than a diameter of the opening of the lampshade 20, to achieve an effect of guiding the assembling of the closing cover 30. It is more convenient to cover the closing cover 30 at the opening of the lampshade 20. The clamping ring 33 is mounted at the bottom of the closing baffle plate 32; and the clamping ring 33 is arranged around the threading posts 31. Meanwhile, bottoms of the threading posts 31 protrude out of the clamping ring 33, which can ensure that the LED 41 is introduced into the cavity of the lampshade 20.

Figure 7:
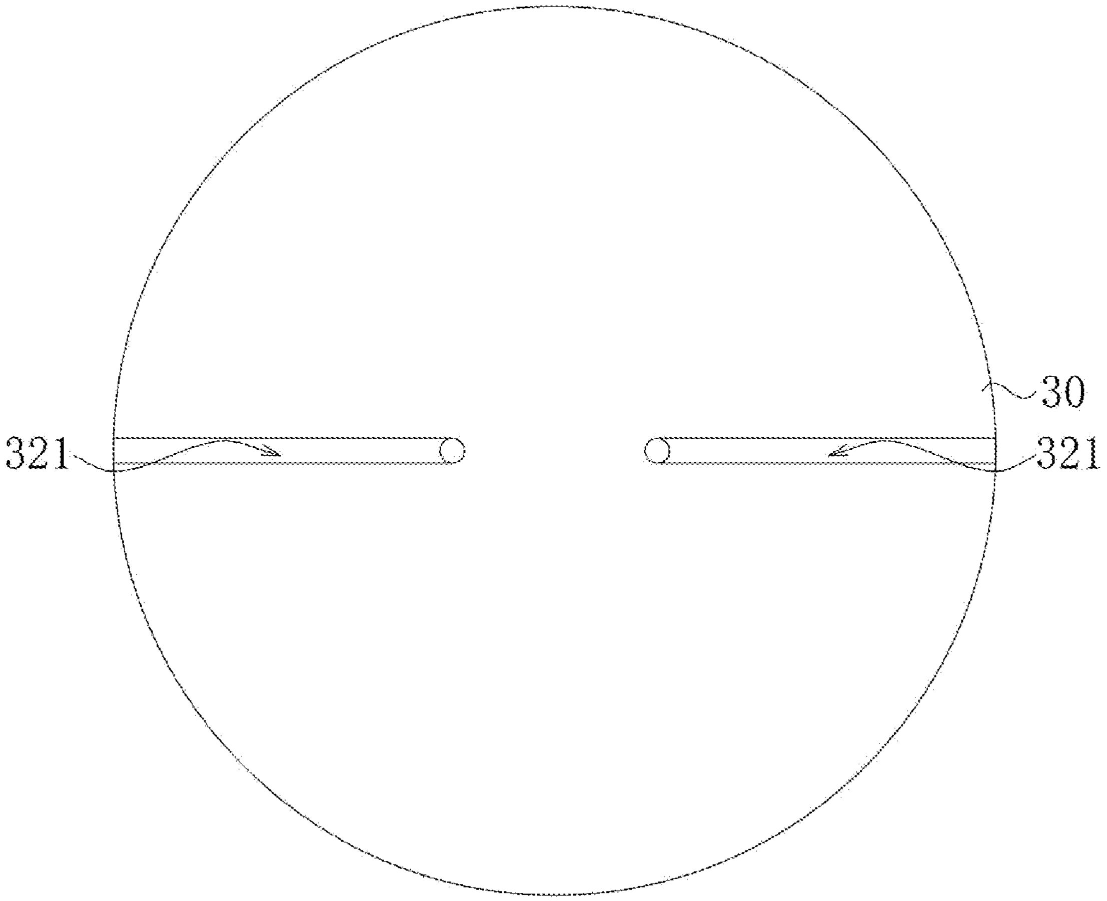
FIG. 7 is a top view of a closing cover of a simple fluorescent filament multi-color lamp bulb according to an embodiment of the present disclosure.

In another embodiment of the present disclosure, as shown in FIG. 7, a top of the closing baffle plate 32 is provided with two placement grooves 321. The placement grooves 321 are arranged along a diameter path of the top of the closing baffle plate 32. Each of the two conductive filaments 42 extends through the closing baffle plate 32 into one end of each of the two placement grooves 321. Threading ports for the two conductive filaments 42 arranged on the closing baffle plate 32 are respectively located at end portions of the two placement grooves 321, which achieves communication between the placement grooves 321 and the threading ports. The other ends of the two placement grooves 321 respectively extend to a side surface of the closing baffle plate 32. The conductive filaments 42 are placed along paths inside the placement grooves 321 from the threading ports, so as to effectively hide the conductive filaments 42 and ensure the flatness of a surface of the closing baffle plate 32.

In another embodiment of the present disclosure, as shown in FIG. 5, a first positioning plate 311 is arranged between each of the threading posts 31 and an inner side surface of the clamping ring 33. The first positioning plate 311 is located inside the clamping ring 33. An edge of the first positioning plate 311 is fixedly connected to the bottom of the closing baffle plate 32, the inner side surface of the clamping ring 33, and an outer side surface of the threading post 31, respectively. The arrangement of the first positioning plates 311 fixes the threading posts 31, which prevents the threading posts 31 from tilting under the action of an external force.

In another embodiment of the present disclosure, as shown in FIG. 5, a second positioning plate 312 is arranged between the two threading posts 31, and an edge of the second positioning plate 312 is fixedly connected to the bottom of the closing baffle plate 32 and outer side surfaces of the two threading posts 31, respectively. The second positioning plate 312 between the two threading posts 31 cooperates with the two first positioning plates 311 on two sides of the two threading posts 31, which further enhances the fixation on the position between them.

In another embodiment of the present disclosure, as shown in FIG. 5, a distance between the two conductive filaments 42 is the same as a distance between closest edges of the two threading holes, and the two conductive filaments 42 respectively resist against inner side surfaces of the two threading holes. Parts, connected to the LED 41, of tops of the two conductive filaments 42 are wider than pin parts at bottoms. Furthermore, a distance between the pin parts at the bottoms is the same as a distance between two closest points of the two threading holes. During assembling of the lampwick main body 40, the pins and the threading holes are clamped to each other, and the tops of the conductive filaments 42 are partially clamped with the end portions of the threading posts 31, so that the position of the LED 41 is located.

Figure 6:
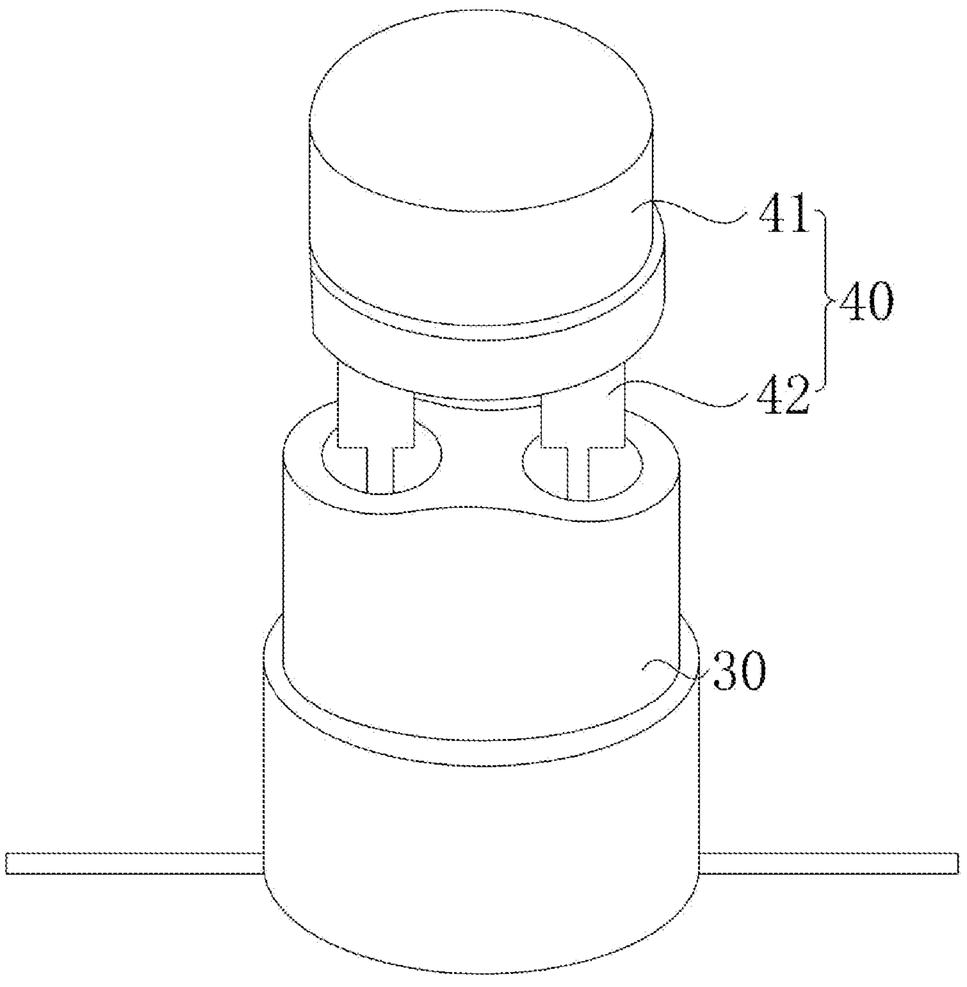
FIG. 6 is an effect picture of assembling a lampwick main body on a closing cover (style II) of a simple fluorescent filament multi-color lamp bulb according to an embodiment of the present disclosure.

In another embodiment of the present disclosure, as shown in FIG. 6, another style of the closing cover 30 is that side surfaces of the two threading posts 31 abut against each other to form a combination. At this time, the combination of the two threading posts 31 is connected to the clamping ring 33 into a whole, and the threading posts 31, the clamping ring 33, and the closing baffle plate 32 are integrally formed.

Figure 13:
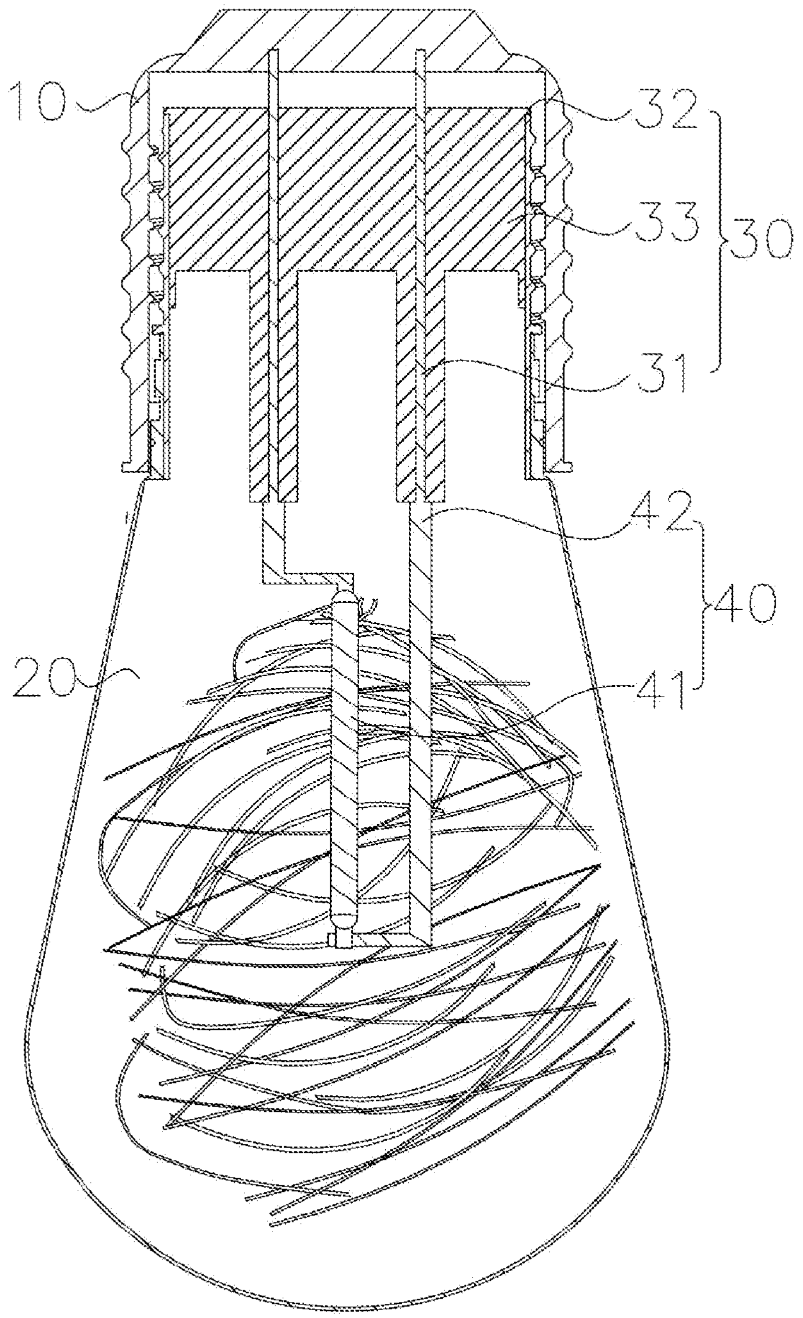
FIG. 13 is a sectional view of an LED light bar embodiment along line A-A in FIG. 2.
Figure 15:
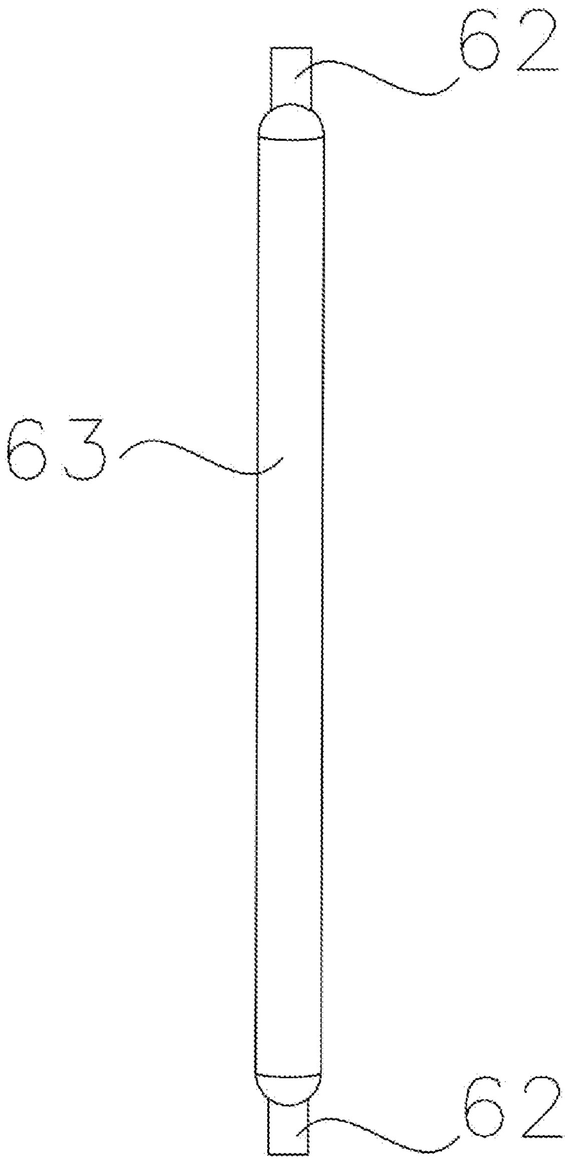
FIG. 15 is a schematic structural diagram of an LED light bar according to the present disclosure.
Figure 16:
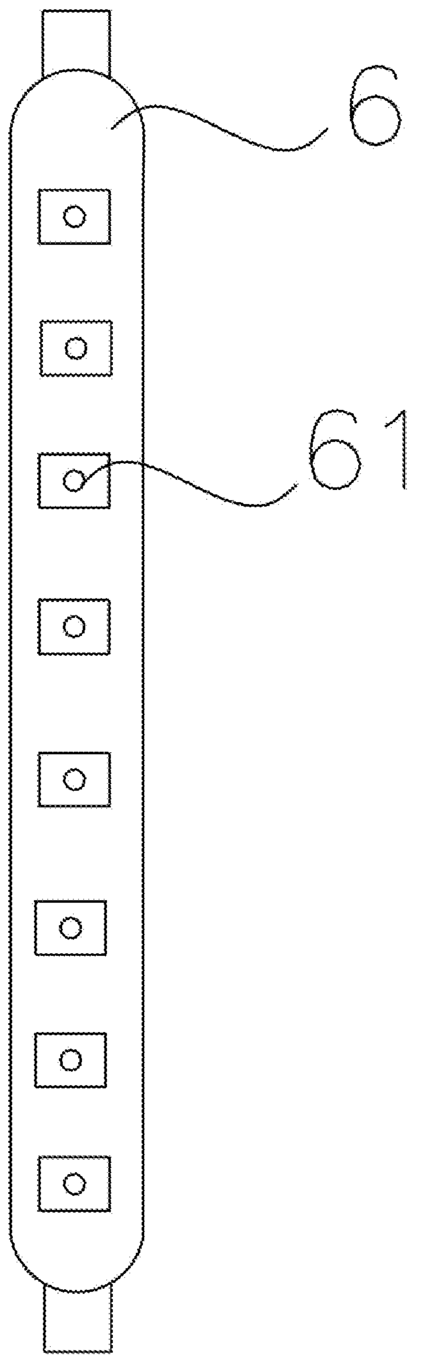
FIG. 16 is a schematic structural diagram of a substrate according to the present disclosure.

Preferably, the LED 41 of this technical solution can also use an LED light bar. As shown in FIG. 13, FIG. 15, and FIG. 16, the LED light bar reflects the light in different directions through the fluorescence reflection devices 50, which can also increase the changes of the light and improve the visual experience of the user, and the light effect of the lamp bulb is colorful. The LED light bar has a substrate 6. A plurality of LED luminous chips 61 configured to emit light are arranged on the substrate 6. The substrate can adopt a printed circuit board (PCB) or a ceramic layout circuit. Two ends of the substrate 6 are provided with conductive end portions 62, which facilitates electrical connection between the light bar and the conductive filaments 42 on the two sides. A surface of the substrate 6 is also provided with a packaging layer 63 configured to package the LED luminous chips 61 to prolong the service life of the LED light bar. The packaging layer 63 can be made of epoxy resin, polyurethane modified epoxy resin, or polyurethane resin with light-transmittance performance. These materials not only can effectively package a circuit and the LED luminous chips, but also have advantages of high-temperature resistance, good toughness, o irritating odor, and the like.

Figure 14:
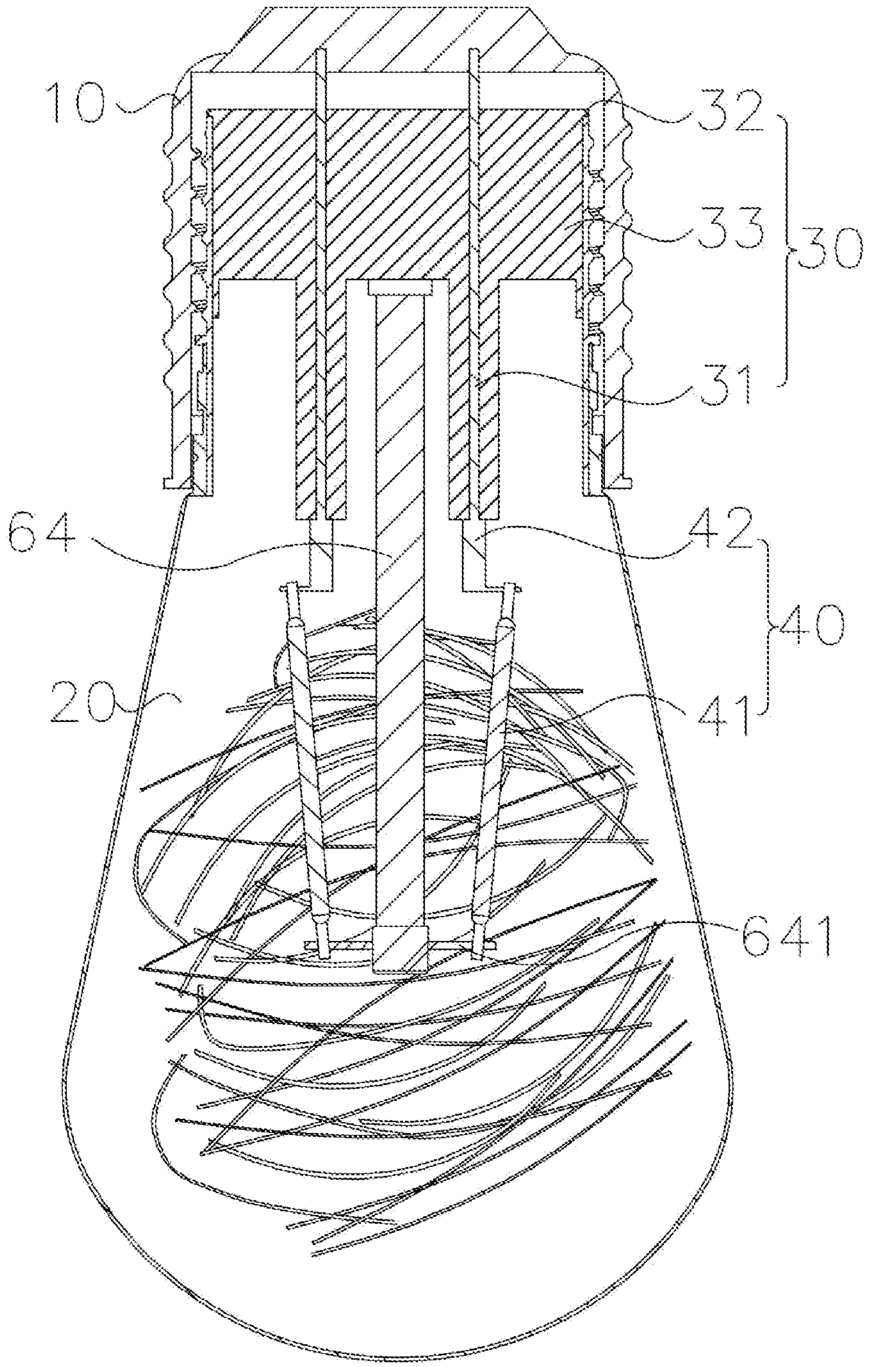
FIG. 14 is a sectional view of an embodiment of two light bars along line A-A in FIG. 2.

In still another embodiment, a quantity of the LED light bar of the lampwick main body 40 of the present disclosure can be determined according to an actual situation. FIG. 14 shows a technical solution with two light bars. If more light bars are used, a lighting effect achieved will be more dazzling. A support column 64 for supporting is arranged between the two LED light bars. The support column 64 is arranged on the closing cover 30, and a conductive wire 641 is arranged at a top end of the support column 64; two ends of the conductive wire 641 are electrically connected to the LED light bars respectively; and the other ends of the LED light bars are electrically connected to the conductive filaments 42.

The above describes the preferred embodiments of the present disclosure and is not intended to limit the present disclosure. Any modification, equivalent replacement, and improvement made within the spirit and scope of the present disclosure shall fall within the protection scope of the present disclosure.

What is claimed is:

1. A simple fluorescent filament multi-color lamp bulb, comprising a lamp holder, a lampshade, a closing cover, a fluorescence reflection device, and a lampwick main body, wherein the closing cover is covered at an opening of the lampshade; two threading posts are arranged at a bottom of the closing cover side by side; the two threading posts are provided with threading holes in a penetrating manner; two conductive filaments of the lampwick main body respectively enter the two threading holes; end portions of the conductive filaments extends upwards through the closing cover; the fluorescence reflection device is placed in the lampshade; the fluorescence reflection device wraps an LED of the lampwick main body; the lamp holder covers the closing cover and is in threaded connection with the lampshade; and the two conductive filaments are both electrically connected to the lamp holder.

2. The simple fluorescent filament multi-color lamp bulb according to claim 1, wherein the fluorescence reflection device comprises a fixing wire and several reflection strips; each of the reflection strips is arranged in an extension direction of the fixing wire; and end portions of each of the reflection strips resist against an inner side surface of the lampshade to irregularly bend and deform.

3. The simple fluorescent filament multi-color lamp bulb according to claim 2, wherein the fixing wire comprises a first fixing wire body and a second fixing wire body; the first fixing wire body and the second fixing wire body are spirally intersected, and each of the reflection strips is clamped between the first fixing wire body and the second fixing wire body.

4. The simple fluorescent filament multi-color lamp bulb according to claim 3, wherein the first fixing wire body and the second fixing wire body are both flexible materials and deform when colliding with an inner wall of the lampshade.

5. The simple fluorescent filament multi-color lamp bulb according to claim 2, wherein the reflection strips are formed by cutting a multifunctional seven-color fluorescent sheet structure.

6. The simple fluorescent filament multi-color lamp bulb according to claim 1, wherein the closing cover further comprises a closing baffle plate and a clamping ring configured to be clamped inside the opening of the lampshade; a flat edge of the closing baffle plate does not go beyond a peripheral edge of the opening of the lampshade; the threading posts are vertically mounted at a bottom of the closing baffle plate; an edge of an opening in a bottom of the clamping ring is bent and closed up towards a center; the clamping ring is mounted at the bottom of the closing baffle plate; and the clamping ring is arranged around the threading posts.

7. The simple fluorescent filament multi-color lamp bulb according to claim 6, wherein a top of the closing baffle plate is provided with two placement grooves; each of the two conductive filaments extends through the closing baffle plate into one end of each of the two placement grooves; and the other ends of the two placement grooves respectively extend to a side surface of the closing baffle plate.

8. The simple fluorescent filament multi-color lamp bulb according to claim 6, wherein a first positioning plate is arranged between each of the threading posts and an inner side surface of the clamping ring, and an edge of the first positioning plate is fixedly connected to the bottom of the closing baffle plate, the inner side surface of the clamping ring, and an outer side surface of the threading posts, respectively.

9. The simple fluorescent filament multi-color lamp bulb according to claim 6, wherein a second positioning plate is arranged between the two threading posts, and an edge of the second positioning plate is fixedly connected to the bottom of the closing baffle plate and outer side surfaces of the two threading posts, respectively.

10. The simple fluorescent filament multi-color lamp bulb according to claim 1, wherein a distance between the two conductive filaments is the same as a distance between closest edges of the two threading holes, and the two conductive filaments respectively resist against inner side surfaces of the two threading holes.

11. The simple fluorescent filament multi-color lamp bulb according to claim 1, wherein the LED is an LED light bar; the LED light bar has a substrate; a plurality of LED luminous chips are arranged on the substrate; two ends of the substrate are provided with conductive end portions; and the simple fluorescent filament multi-color lamp bulb further comprises a packaging layer arranged on a surface of the substrate and configured to package the LED luminous chips.

12. The simple fluorescent filament multi-color lamp bulb according to claim 11, wherein the lampwick main body comprises at least two LED light bars; a support column is arranged between the two LED light bars; the support column is arranged on the closing cover, and a conductive wire is arranged at a top end of the support column; two ends of the conductive wire are electrically connected to the LED light bars respectively; and the other ends of the LED light bars are electrically connected to the conductive filaments.

* * * * *